(12) United States Patent
Aoki et al.

(10) Patent No.: US 7,809,199 B2
(45) Date of Patent: Oct. 5, 2010

(54) IMAGE PROCESSING APPARATUS

(75) Inventors: Shinji Aoki, Saitama (JP); Hitoshi Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 897 days.

(21) Appl. No.: 11/565,972

(22) Filed: Dec. 1, 2006

(65) Prior Publication Data

US 2007/0127847 A1 Jun. 7, 2007

(30) Foreign Application Priority Data

Dec. 7, 2005 (JP) ............................. 2005-353808

(51) Int. Cl.
| | |
|---|---|
| G06K 9/34 | (2006.01) |
| G06K 9/36 | (2006.01) |
| G06K 9/46 | (2006.01) |
| G06K 9/20 | (2006.01) |
| G06K 9/32 | (2006.01) |
| G06K 15/02 | (2006.01) |
| H04N 1/393 | (2006.01) |
| H04N 1/36 | (2006.01) |

(52) U.S. Cl. ...................... 382/232; 382/176; 382/283; 382/284; 382/300; 358/1.2; 358/451; 358/525

(58) Field of Classification Search .................. 382/173, 382/176, 232–233, 244, 276, 282–284, 286, 382/291, 293–294, 298–300; 358/1.2, 525, 358/538–540, 448–453, 462

See application file for complete search history.

(56) References Cited

U.S. PATENT DOCUMENTS

| 5,621,870 | A * | 4/1997 | Shyu et al. | 345/671 |
|---|---|---|---|---|
| 6,437,881 | B1 * | 8/2002 | Baba et al. | 358/434 |
| 6,731,800 | B1 * | 5/2004 | Barthel et al. | 382/176 |
| 2002/0176631 | A1 * | 11/2002 | Li | 382/238 |
| 2003/0123729 | A1 * | 7/2003 | Mukherjee et al. | 382/176 |
| 2004/0001624 | A1 * | 1/2004 | Curry et al. | 382/173 |
| 2004/0056981 | A1 * | 3/2004 | Hamamura et al. | 348/578 |
| 2004/0105129 | A1 * | 6/2004 | Kawakami | 358/2.1 |

(Continued)

FOREIGN PATENT DOCUMENTS

JP 09154009 A * 6/1997

(Continued)

*Primary Examiner*—Vu Le
*Assistant Examiner*—Nathan Bloom
(74) *Attorney, Agent, or Firm*—Oblon, Spivak, McClelland, Maier & Neustadt, L.L.P.

(57) ABSTRACT

Image forming apparatus, which prevents the occurrence of displacement of the positions of pixels between image data items forming a synthetic image, and eliminates distortion of a character and color shift in character regions and non-character regions. An image size adjustment section obtains, when synthesizing a plurality of image data items to create one image, a remainder by dividing the number of vertical and horizontal pixels of input image data by a least common multiple of the ratio of resolutions of a plurality of image data items, for vertical and horizontal directions of the image. The input image data is processed by means of the result of computing the remainder, so that the remainder becomes 0 when obtaining the remainder by dividing the number of vertical and horizontal pixels of the input image data by the least common multiple of the ratio of the resolutions of the image data items.

11 Claims, 14 Drawing Sheets

U.S. PATENT DOCUMENTS

2006/0133690 A1* 6/2006 Bloomberg et al. ......... 382/269
2006/0269151 A1* 11/2006 Sakuyama ................. 382/232
2007/0098285 A1* 5/2007 Yahata et al. ............... 382/239

FOREIGN PATENT DOCUMENTS

| JP | 11-261833 | 9/1999 |
| JP | 2002281292 A * | 9/2002 |
| JP | 2002-368986 | 12/2002 |
| JP | 2003-219187 | 7/2003 |
| JP | 2005117615 A * | 4/2005 |
| JP | 2006-238405 | 9/2006 |

* cited by examiner

FIG. 4
"B" INDICATES BLACK
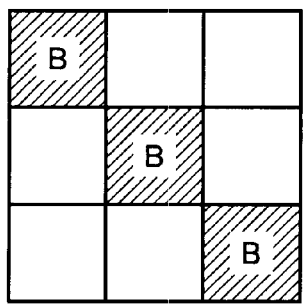
BLACK CHARACTER IMAGE
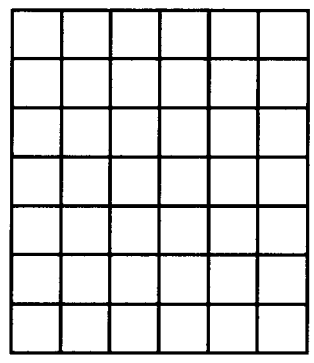
BINARY IMAGE
SYNTHESIS
SYNTHESIS IMAGE ( = IN THIS CASE, SYNTHETIC IMAGE OF AN ENLARGED IMAGE AND BINARY IMAGE OF THE BLACK CHARACTER IMAGE )
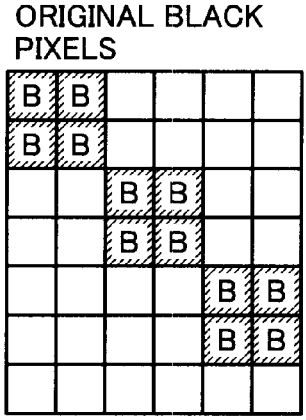
ORIGINAL BLACK PIXELS
CHARACTER DISTORTION CAUSED BY THE DIFFERENCE IN RESOLUTION BETWEEN THE BLACK CHARACTER IMAGE AND BINARY IMAGE
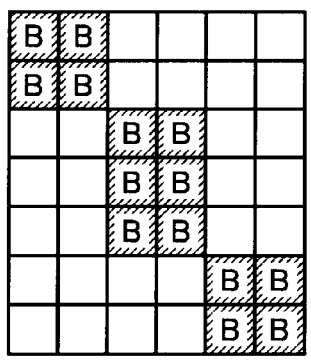

FIG. 5
"B" AND "Y" INDICATE
BLACK AND YELLOW RESPECTIVELY

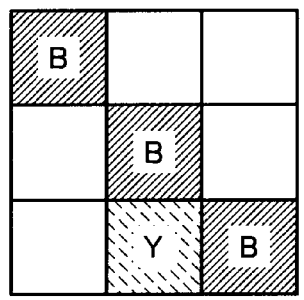

BINARY IMAGE

CHARACTER IMAGE

"C" INDICATES A PIXEL
WHICH IS A CHARACTER.
IN THESE PIXELS,
COLORS ARE SELECTED
FROM THE CHARACTER IMAGE.

SYNTHESIS

SYNTHETIC IMAGE ( = IN THIS CASE,
SYNTHETIC IMAGE OF AN ENLARGED
IMAGE AND BINARY IMAGE OF THE
CHARACTER IMAGE )

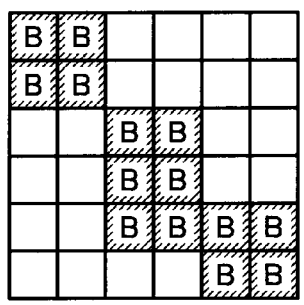

ORIGINAL SHAPE

DISTORTION IN CHARACTER AND NON-CHARACTER REGION,
WHICH IS CAUSED BY THE DIFFERENCE IN RESOLUTION
BETWEEN THE BACKGROUND IMAGE OR CHARACTER IMAGE
AND BINARY IMAGE

FIG. 8

| | DETERMINATION FOR CHROMATIC ORIGINAL ONLY | ORIGINAL COPY WITH CHARACTERS | PICTURE ON PRINTING PAPER | PRINTED PICTURE |
|---|---|---|---|---|
| ORIGINAL COPY WITH CHARACTERS ONLY | — | YES | NO | NO |
| COLOR ORIGINAL COPY | YES | — | — | — |

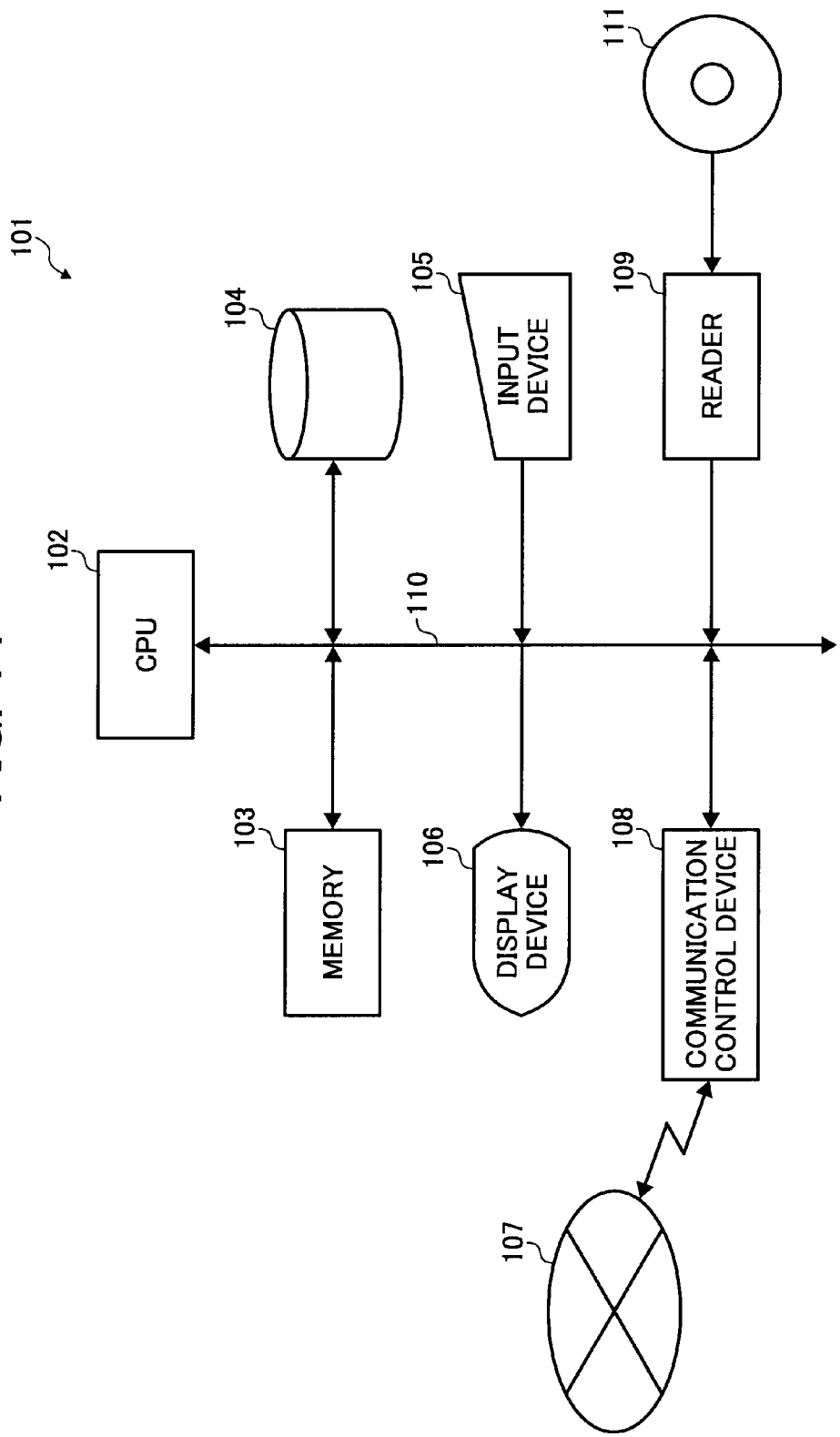

IMAGE PROCESSING APPARATUS

BACKGROUND OF THE INVENTION

1. Field of the Invention

The present invention relates to an image processing apparatus, and particularly to an image processing apparatus for synthesizing a plurality of image data items to create one image.

2. Description of the Related Art

Lossy compression of, for example, a JPG file can create a small file with extremely high compression rate. Such compression is effective for a picture, but does not have good readability of characters in a binary image such as a character image because an edge of a character blurs.

Therefore, as disclosed in Japanese Patent Application Laid-Open No. 2002-368986 (Prior Art 1) and Japanese Patent Application No. 3193086 (Prior Art 2), there is proposed a technology which is capable of creating an image file having high compression rate, while maintaining high resolution of a edge of a character by outputting the character at binary resolution, by selectively switching two image data items, i.e. image data with high compression rate and binary data with high resolution in lossy compression, which are contained in one file, with binary data (character region) having high resolution.

When a user uses such a file created in the above method, a plurality of compressed image data items are expanded, and synthetic image data items are displayed by an application on a monitor, or the expanded and synthesized image data items are printed out by a printer or the like.

However, when performing such synthesis, there arise various problems attributable to the differences in resolution. For example, Japanese Patent Application Laid-Open No. H11-261833 (Prior Art 3) and Japanese Patent Application Laid-Open No. 2003-219187 (Prior Art 4) describe these problems as follows.

Prior Art 3 mentions a problem caused when synthesizing an image having data selecting a character part and non-character part, and an image containing a picture having resolution different from that of the above data. Specifically, the image containing a picture has pixels which are selected and pixels which are not selected, and the pixels which are not selected may have any pixel values. The pixels which are selected are called "effective pixels", and the pixels which are not selected are called "ineffective pixels". When the image containing a picture is filed by reducing the resolution thereof lower than that of selected data, the image containing a picture is enlarged at the time of synthesis. When the image containing a picture is enlarged, an interpolation algorithm such as a bilinear method is often used. When enlarging the image, a border section between the effective pixels and ineffective pixels becomes an intermediate value between the effective pixels and ineffective pixels after enlargement. As a result, blurring occurs in the border section. In order to avoid such blurring, the pixel values of the ineffective pixels are prevented from being affected even when increasing the effective pixels to take an intermediate value.

Prior Art 4 discloses how one image data item is expressed by three image data items. One of the three image data items is obtained by performing reduction processing (pixel density conversion) on an image which is obtained by binarizing an original image. Prior Art 4 also discloses positional displacement caused at the time of reduction processing, in the difference in resolution between the original image and the image data obtained after the reduction processing.

When displaying/printing a synthetic image, if the resolution of the image data configuring the synthetic image is different, displacement of the positions of pixels between the images occurs in the synthetic image, causing visual distortion of the character part and color shift. How such displacement occurs depends on the algorithm for enlarging image data. Such a problem occurs under conditions where there is a remainder when the number of vertical and horizontal pixels are divided by a common multiple of the ratio of the resolution of each image data item in vertical and horizontal directions. When the remainder is 0, this problem does not occur.

Also, the above-described conventional technologies for generating a synthetic image do not mention the above problem. The technology disclosed in Prior Art 3 is for avoiding blurring created in the border section by the interpolation algorithm as described above, and thus does not at all describe the technical means for solving such problem. Moreover, Prior Art 4 mentions the displacement caused by the difference in resolution between the original image and the image data obtained after the reduction processing as described above, but does not at all describe problems caused by the difference in resolution between the constituent image data items.

SUMMARY OF THE INVENTION

The present invention is therefore contrived in view of the above problems, and an object of the present invention is to provide an image processing apparatus capable of preventing the occurrence of pixel displacement between image data items forming a synthetic image, and of resolving distortion of a character and color shift in character regions and non-character regions, the distorted character and color shift being caused at the time of printing.

In an aspect of the present invention, an image processing apparatus comprises an image size adjustment section, which, in order to synthesize a plurality of image data items to create one image, divides, respectively, the number of pixels, in a vertical direction and in a horizontal direction, of input image data by the maximum value of the ratio of resolutions of the plurality of image data items configuring the synthetic image, and adjusts the image size. The image size adjustment section comprises a remainder computation device for obtaining the ratio from the resolutions of the plurality of image data items, and computing a remainder by dividing, respectively, the number of pixels in the vertical direction and in the horizontal direction of the input image data by the maximum value of the ratio; and a size adjusting device for adjusting, respectively, the number of pixels in the vertical direction and in the horizontal direction of the input image data, on the basis of the remainder computed by the remainder computation means, so that the remainder becomes 0.

In another aspect of the present invention, an image processing method comprises image size adjusting step of, in order to synthesize a plurality of image data items to create one image, dividing, respectively, the number of pixels in a vertical direction and in a horizontal direction of input image data by the maximum value of the ratio of resolutions of the plurality of image data items configuring the synthetic image, and adjusting the image size. The image size adjusting step comprises a remainder computation step of obtaining the ratio from the resolutions of the plurality of image data items, and computing a remainder by dividing, respectively, the number of pixels in the vertical direction and in the horizontal direction of the input image data by the maximum value of the ratio; and a size adjusting step of adjusting, respectively, the number of pixels in the vertical direction and in the horizontal direction of the input image data, on the basis of the remainder computed in the remainder computation step, so that the remainder becomes 0.

In another aspect of the present invention, an image processing program is programmed so that a computer can control an image processing method. The image processing method comprises image size adjusting step of, in order to synthesize a plurality of image data items to create one image, dividing, respectively, the number of pixels in a vertical direction and in a horizontal direction of input image data by the maximum value of the ratio of resolutions of the plurality of image data items configuring the synthetic image, and adjusting the image size. The image size adjusting step comprises a remainder computation step of obtaining the ratio from the resolutions of the plurality of image data items, and computing a remainder by dividing, respectively, the number of pixels in the vertical direction and in the horizontal direction of the input image data by the maximum value of the ratio; and a size adjusting step of adjusting, respectively, the number of pixels in the vertical direction and in the horizontal direction of the input image data, on the basis of the remainder computed in the remainder computation step, so that the remainder becomes 0.

In another aspect of the present invention, a recording medium is recorded in a format in which the computer can read an image processing program. The image processing program is programmed so that a computer can control an image processing method. The image processing method comprises image size adjusting step of, in order to synthesize a plurality of image data items to create one image, dividing, respectively, the number of pixels in a vertical direction and in a horizontal direction of input image data by the maximum value of the ratio of resolutions of the plurality of image data items configuring the synthetic image, and adjusting the image size. The image size adjusting step comprises a remainder computation step of obtaining the ratio from the resolutions of the plurality of image data items, and computing a remainder by dividing, respectively, the number of pixels in the vertical direction and in the horizontal direction of the input image data by the maximum value of the ratio; and a size adjusting step of adjusting, respectively, the number of pixels in the vertical direction and in the horizontal direction of the input image data, on the basis of the remainder computed in the remainder computation step, so that the remainder becomes 0.

In another aspect of the present invention, an image forming apparatus comprises an image processing apparatus. The image processing apparatus comprises an image size adjustment section, which, in order to synthesize a plurality of image data items to create one image, divides, respectively, the number of pixels, in a vertical direction and in a horizontal direction, of input image data by the maximum value of the ratio of resolutions of the plurality of image data items configuring the synthetic image, and adjusts the image size. The image size adjustment section comprises a remainder computation device for obtaining the ratio from the resolutions of the plurality of image data items, and computing a remainder by dividing, respectively, the number of pixels in the vertical direction and in the horizontal direction of the input image data by the maximum value of the ratio; and a size adjusting device for adjusting, respectively, the number of pixels in the vertical direction and in the horizontal direction of the input image data, on the basis of the remainder computed by the remainder computation means, so that the remainder becomes 0.

BRIEF DESCRIPTION OF THE DRAWINGS

The above and other objects, features and advantages of the present invention will become more apparent from the following detailed description taken with the accompanying drawings in which:

FIGS. 1 through 5 are figures for explaining the problems of the conventional technologies related to the present invention;

FIG. 8 is a figure showing conditions for determination made by an original copy type determination section of the scanner correction section;

FIG. 14 is a block diagram showing an electrical connection in a computer according to other embodiment of the present invention.

DESCRIPTION OF THE PREFERRED EMBODIMENTS

Hereinafter, the problems of the conventional technologies related to the present invention are described in detail with reference to the drawings before explaining the present invention.

As already described above, when displaying/printing a synthetic image, if the resolution of the image data configuring the synthetic image is different, displacement of the positions of pixels between the images occurs in the synthetic image, causing visual distortion of the character part and color shift. This problem is described below in detail.

Suppose that there are four image data items to be synthesized, i.e. a black character image, character image, binary image, and background image. The black character image is an image obtained by extracting black characters from an original image, the character image is an image obtained by extracting colors of the characters other than black characters on the original image, the binary image is an image obtained by extracting colored characters, and the background image is an image obtained by extracting the sections other than the characters on the original image.

Figure 1:
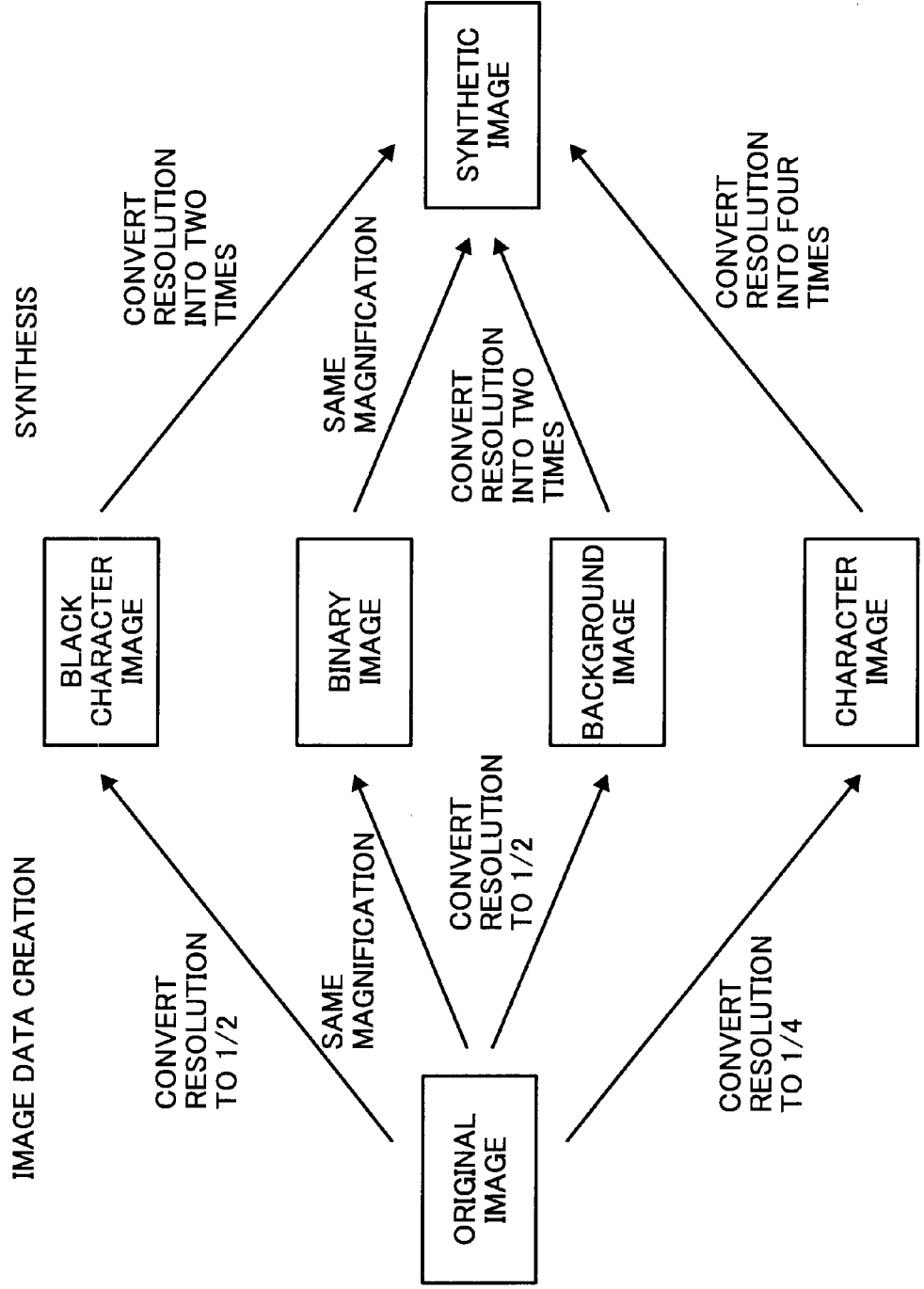

Regarding the resolution of each image data item, the resolution of the black character image and background image is ½ of the resolution of the original image, the resolution of the character image is ¼ of the resolution of the original image, and the resolution of the binary image is one time the resolution of the original image. At this moment, as shown in FIG. 1, the resolution of the black character image and background image is changed to two times the resolution of the original image, the resolution of the character image is changed to four times the resolution of the original image, and the resolution of the binary image is changed to one time the resolution of the original image, to superimpose these images to obtain a synthetic image.

First of all, the image data items are created. Suppose that the resolution of the original image is 300 dpi and the number of horizontal pixels is 3003 pixels. The number of horizontal pixels for the generated four image data items may be multiplied by the magnification of the resolution required when creating the image data, thus the following computations may be performed:

Number of horizontal pixels of the black character image/background image=3003/2=1501.5

Number of horizontal pixels of the character image=3003/4=750.75

Number of horizontal pixels of the binary image=3003/1=3003

The number of pixels is expressed as an integer of at least 1, thus the integers expressing the number of pixels of the black character image, background image, and character image have to be rounded up or rounded down. Here, the integers are rounded down. Therefore, each image data item has the number of horizontal pixels shown below:

Number of horizontal pixels of the black character image/background image=3001/2=1501

Number of horizontal pixels of the character image=3000/4=750

Number of horizontal pixels of the binary image=3003/1=3003

Next, the four image data items are synthesized. At the time of synthesis, the magnification of the resolution shown in FIG. 1 may be used in the multiplication, thus the number of horizontal pixels shown below is obtained:

Number of horizontal pixels of the black character image/background image=1501×2=3002

Number of horizontal pixels of the character image=750×4=3000

Number of horizontal pixels of the binary image=3003×1=3003

Figure 2:
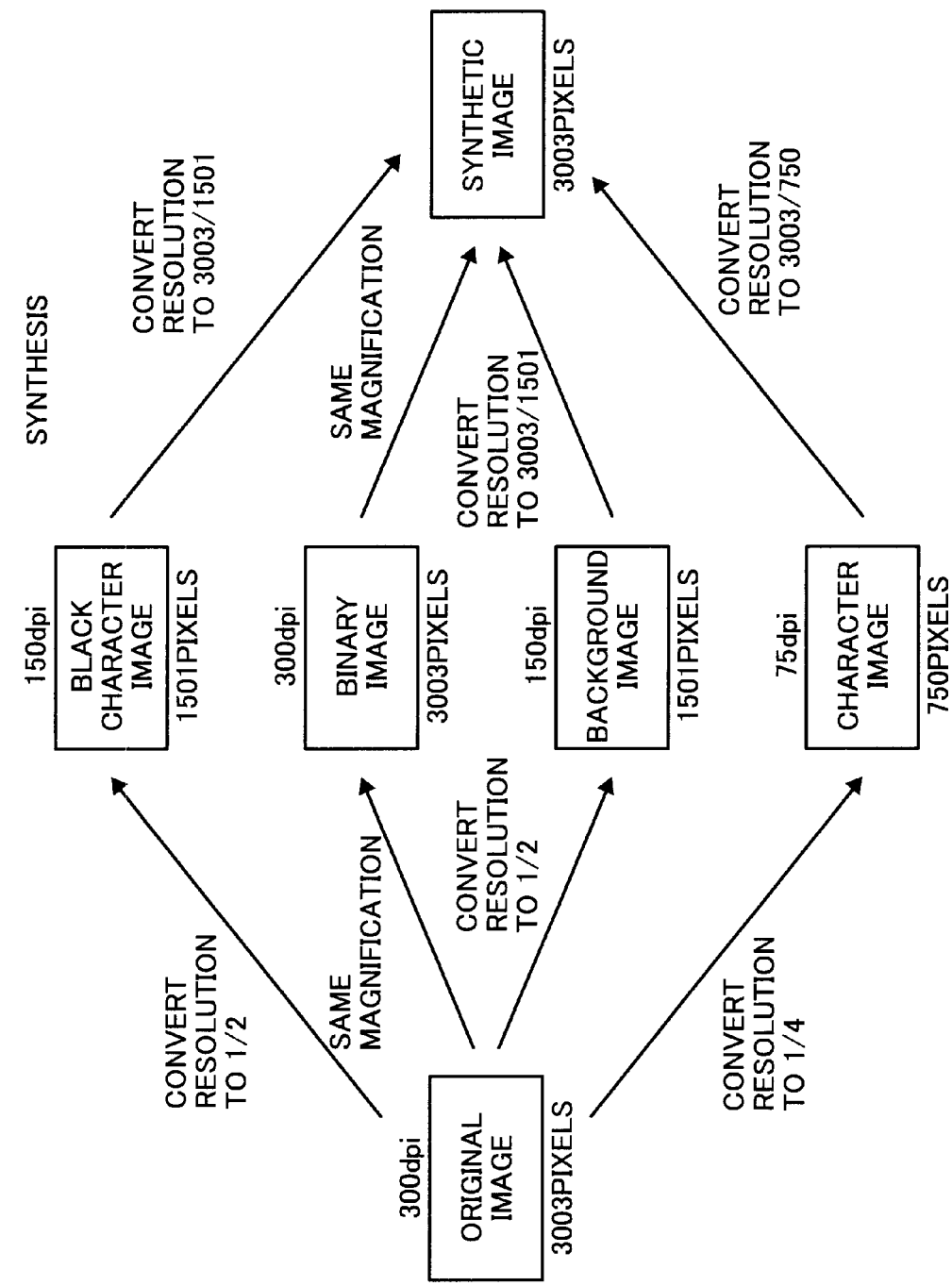

As shown above, the number of horizontal pixels is different for each image data item. In order to display a synthetic image by using the same number of horizontal pixels as the original image, the number of pixels needs to be same in all of the image data items. When considering that the number of pixels of all image data items is magnified/increased to 3003 pixels, each of the image data items needs to be enlarged at the magnification shown in FIG. 2. The computation formulae for the magnification are as follows:

Number of horizontal pixels of the black character image/background image=3003/1501

Number of horizontal pixels of the character image=3003/750

Number of horizontal pixels of the binary image=3003/3003

Figure 3:
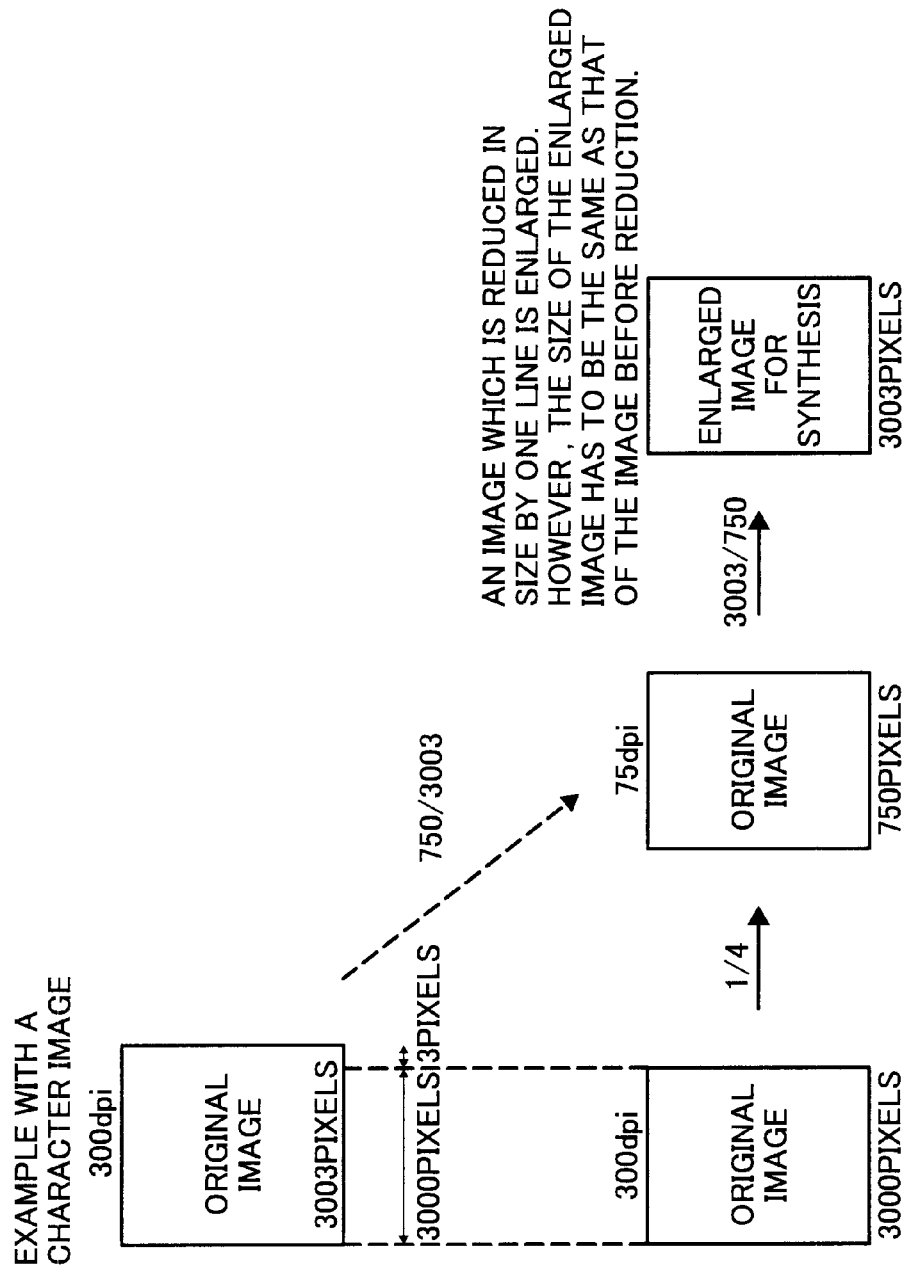

As shown in the black character image, background image, and character image above, the product of the reducing magnification when generating the image data and the enlarging magnification for synthesis is not 1 and is larger than 1. The reason is that, although the fractional part of the number of pixels is rounded down when generating each image data item as shown in FIG. 3, when increasing the number of pixels, the number of pixels does not increase by the number of pixels rounded down, but increases to the number of pixels obtained before rounding down.

How the above-described fact affects the quality of the enlarged image depends on the algorithm for enlargement, but the above fact means that pixel displacement occurs when superimposing the original image on the enlarged image data. Furthermore, when synthesizing the images obtained by enlarging the respective image data items, pixel displacement occurs between the images.

This pixel displacement can be seen as character distortion or color shift when displaying/printing the synthetic image. Such a phenomenon is described in detail. FIG. 4 is a figure for explaining displacement of characters which is caused by the difference in resolution between the black character image and the binary image. By increasing the data of the black character image by one time or more, the black character part in a part of the image increases, and a part which is not originally the black character part is processed as a black pixel.

FIG. 5 is a figure for explaining color shift in a character region, which is caused by the difference in resolution between the binary image and the character image. The color of a part of the binary image may differ from the original color because of increase in the character region and a non-character region. It should be noted that the figure explains that the resolution of the character image is 150 dpi for convenience.

As described above, character distortion and color shift occur because of the pixel displacement between the image data item. How such displacement occurs depends on the algorithm for enlargement.

Such a problem occurs under conditions where there is a remainder when the number of vertical and horizontal pixels are divided by a common multiple of the ratio of the resolution of each image data item in vertical and horizontal directions. When the remainder is 0, this problem does not occur.

Also, the above-described conventional technologies for generating a synthetic image do not mention the above problem. The technology disclosed in Prior Art 3 is for avoiding blurring created in the border section by the interpolation algorithm as described above, and thus does not at all describe the technical means for solving such problem. Moreover, Prior Art 4 mentions the displacement caused by the difference in resolution between the original image and the image data obtained after the reduction processing as described above, but does not at all describe problems caused by the difference in resolution between the constituent image data items.

An embodiment of the present invention is described hereinafter.

Figure 6:
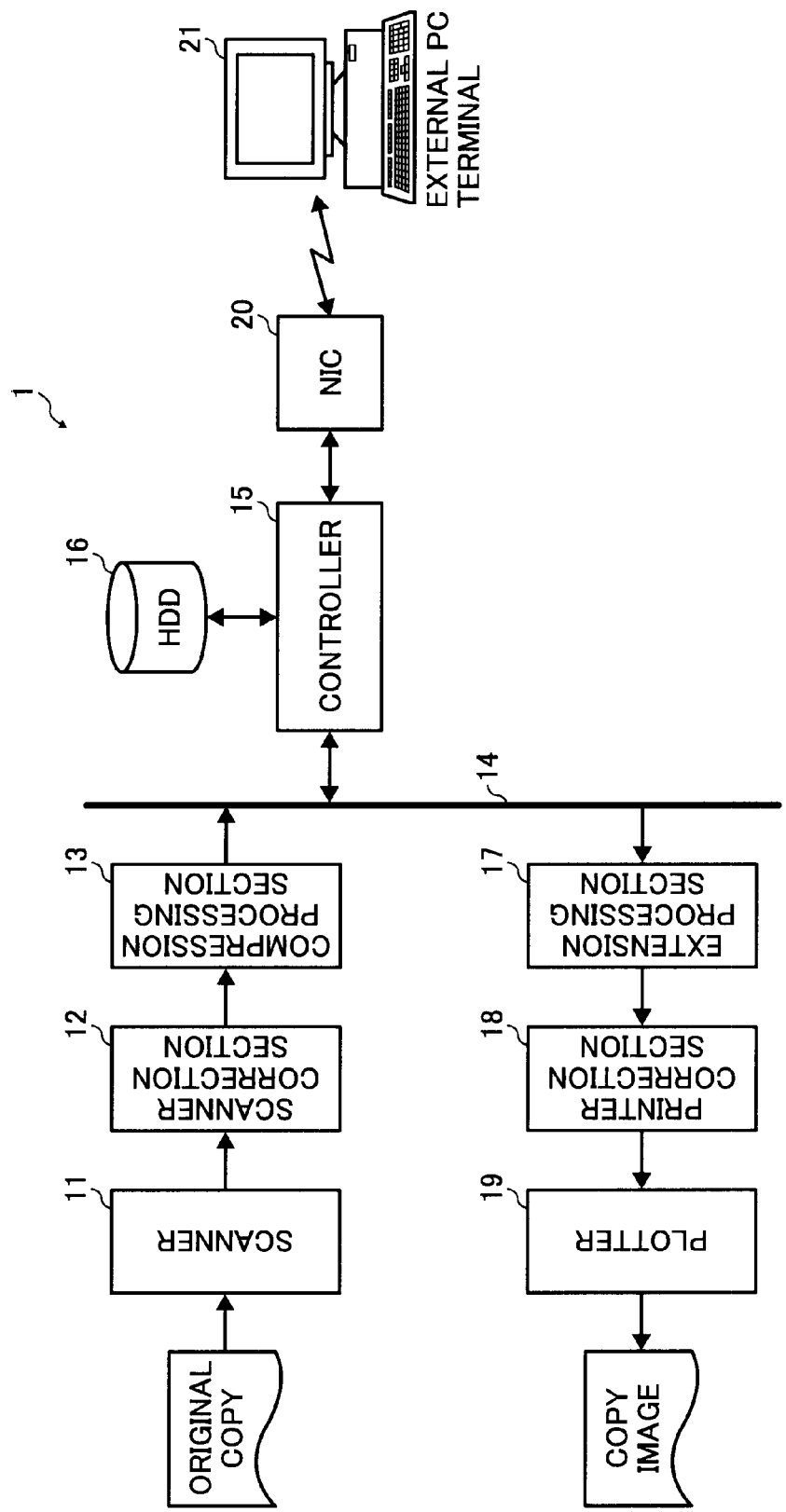
FIG. 6 is a block diagram showing a schematic configuration of a digital color copying machine according to an embodiment of the present invention.

FIG. 6 shows a schematic configuration of a digital color copying machine according to the present embodiment. The color copying machine implements the image processing apparatus of the present invention. As shown in the figure, in this color copying machine 1, a scanner 11 reads image data from an original copy, converts the image data (analog signal) into digital data, and outputs thus obtained data. As described hereinafter, a scanner correction section 12 sorts an image region into a character/line image or a picture with respect to the image data (digital data) read by the scanner 11, and subjects RGB data of an original copy image to filter processing or other image processing. A compression processing section 13 performs compression processing on 8-bit image data, an edge character region signal (1 bit), and a color region signal (1 bit) of each of the RGB, which are processed by the scanner correction section 12, and transmits thus obtained data to a general-purpose bus 14. The compressed image data is transmitted to a controller 15 via the general-purpose bus 14. The controller 15 has an HDD 16 and accumulates the transmitted data therein. The accumulated data records the image size and the type of a read original copy as bibliographic information. It should be noted here that the compression processing section 13 compresses the image data, but if the general-purpose bus 14 has a sufficiently wide bandwidth and the HDD 16 for accumulating the image data has a large capacity, the data may be used without being compressed.

Next, the controller 15 transmits image data of the HDD 16 to an extension processing section 17 via the general-purpose bus 14. The extension processing section 17 the image data, which was subjected to the compression processing, to the 8-bit data, edge character region signal (1 bit), and color region signal (1 bit) of each of the RGB, and transmits thus obtained data to a printer correction section 18. The printer correction section 18 converts the RGB image data into YMCBk data, and replaces a section which is not a color region signal but an edge character region signal to single-color data of Bk which is a black character. Moreover, the printer correction section 18 performs γ correction processing, gradation processing and the like, and perform correction processing or tone value conversion processing on the contrast characteristics of a plotter 19. The tone value conversion processing here is a process of image data conversion from 8 bits to 2 bits for each color by means of error diffusion of dither processing. The plotter 19 is a transfer sheet printing unit using a laser beam writing process, and performs image formation by means of an electrophotographic system by rendering the 2-bit image data as a latent image onto a photoconductor, performing image formation/transfer processing by means of a toner, and then forming a copy image onto a transfer paper.

When the color copying machine 1 operates as a delivery scanner delivering image data to a PC via a network, the image data is sent to the controller 15 via the general-purpose bus. The controller 15 performs color conversion processing, format processing and the like. In tone processing, tone conversion processing is carried out in accordance with a mode when the color copying machine 1 operates as the delivery scanner. In the format processing, general-purpose image format conversion or the like for converting the image data into JPEG or TIFF format is performed. Thereafter, the image data is delivered to an external PC terminal 21 via a NIC (Network Interface Controller) 20.

Further, when the color copying machine 1 operates as a printer for printing out an image from a PC via a network, the image or a command for instructing to print the image is analyzed from the data by the NIC 20, the image or the command is then expanded into a printable bitmap as image data, and the expanded data is then compressed and then accumulated. The accumulated data is then written into the HDD 16. When accumulating the image data, bibliographic information described hereinafter is also written into the HDD 16.

Next, the controller 15 transmits the image data in the HDD 16 to the extension processing section 17 via the general-purpose bus 14. The extension processing section 17 stretches out the image data, which has been subjected to compression processing, to the original 8-bit data, and transmits the data to the printer correction section 18. The printer correction section 18 converts, for example, a RGB input into YMCBk data. Next, the γ correction processing, gradation processing and the like are performed independently on each of YMCBk, and the correction processing or tone value conversion processing is performed on the contrast characteristics of a plotter 19. The tone value conversion processing here is a process of image data conversion from 8 bits to 2 bits by means of error diffusion of dither processing. The plotter 19 is a transfer sheet printing unit using a laser beam writing process, renders the 2-bit image data as a latent image onto a photo conductor, performs image formation/transfer processing by means of a toner, and then forms a copy image onto a transfer paper.

A digital copying machine generally reads an original copy using a scanner, converts the image data on the original copy into digital data, and divides an image region (image areas) on the original copy into regions having different characteristics (image area separation). The digital copying machine further performs various image processing on the image data on the basis of a result obtained by judging to which region a target pixel belongs. Accordingly, the image quality of an output image is improved significantly.

Next, the scanner correction section 12 is explained in detail.

Figure 7:
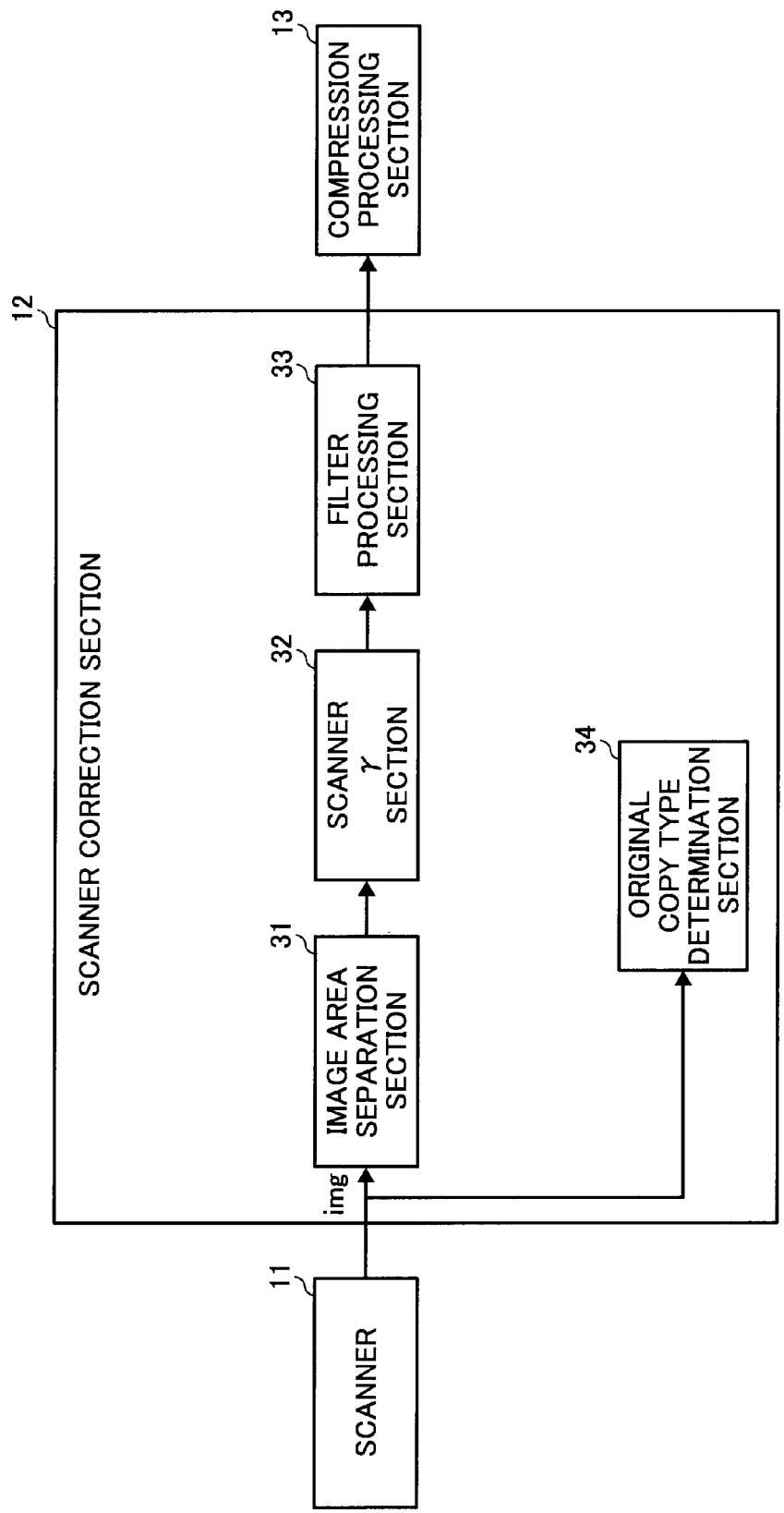
FIG. 7 is a block diagram showing a configuration of a scanner correction section of the color copying machine.

As shown in FIG. 7, the scanner correction section 12 performs image area separation on the basis of image data img (reflectance linear) which is inputted from the scanner 11. In this example, an image area separation section 31 separates an image region into three regions, i.e. a black edge character region, color edge character region, and other region (picture region), by means of the image area separation method used in the technology disclosed in Japanese Patent Application Laid-Open No. 2003-259115. By performing the image area separation, an image area separation signal (edge character region, color region) is applied to the image data for each pixel. The image area is divided into the black edge character region (not a color region but edge character region), color edge character region (edge character region which is a color region), and picture region (region other than the above regions).

A scanner γ section 32 converts the image data from the reflectance linear data into density linear data.

A filter processing section 33 switches filter processing by means of the image area separation signal. Specifically, in the edge character region (black edge character and color edge character), sharpening processing is performed with the emphasis on readability. In the picture region, a drastic change in density in the image data is taken as edge amount, and smoothening processing or sharpening processing is performed in accordance with the edge amount. The reason that the drastic edge is sharpened is to make the characters in the drawing easy to read.

An original copy type determination section 34 determines the type of the original copy by using an original copy determination block described in Japanese Patent Application Laid-Open No. 2000-324338. Specifically, the original copy type determination section 34 determines whether an original copy contains characters only or is colored, based on four characteristics: determination on original copy with characters; colored original copy determination; picture determination on printing paper; and printed picture determination. A result of this determination is recorded as bibliographic information when accumulating images. As shown in FIG. 8, the original copy is determined as an original copy with characters only, when "original copy with characters" (yes), "original copy with picture on printing paper" (no), and "original copy with printed picture" (no) out of the above-described determination conditions are satisfied. The original copy is determined as a colored original copy when "colored original copy" (yes) is satisfied. "An original copy with characters only" is an original copy on which only characters are present. Here, a picture on a copied original copy, an inkjet original copy or the like is subjected to tone processing and is classified as either a printed paper picture or a printed picture original copy.

Figure 9:
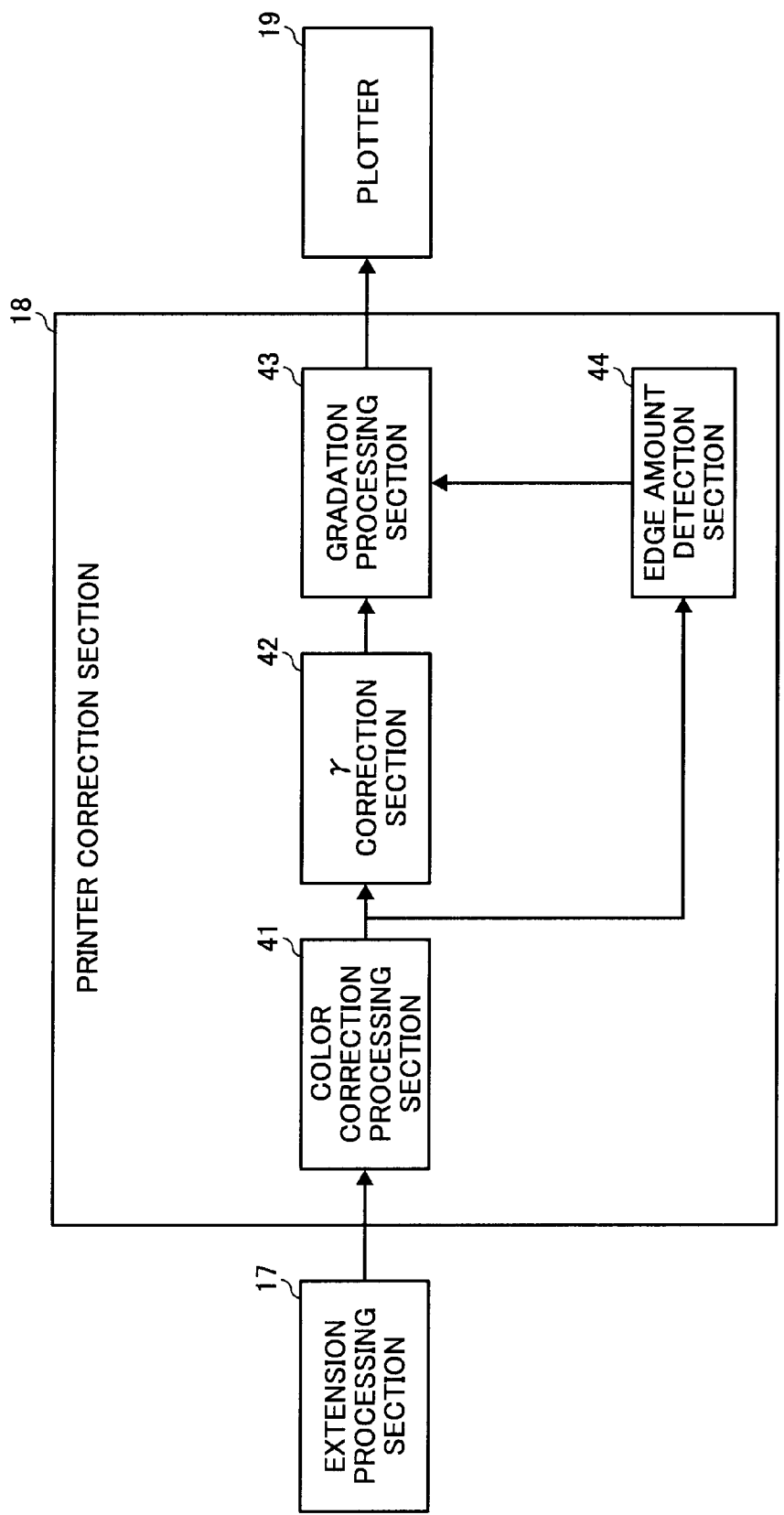
FIG. 9 is a block diagram showing a configuration of a printer correction section of the color copying machine.

As shown in FIG. 9, the printer correction section 18 comprises a color correction processing section 41 performs data conversion of the image data, which has gone through the compression processing section 13 and the extension processing section 17, to convert a RGB input of into YMCBk data, a γ correction section 42 which performs γ correction in response to the γ characteristics of the plotter, a gradation processing section 43 which performs quantization such as dither processing/error processing, and performs tone correction, and an edge amount detection section 44 which detects a drastic change in density in the image data, as edge amount.

Specifically, the color correction processing section 41 converts R, G, B data into C, M, Y data by means of primary density masking method or the like. In order to improve color reproduction of the image data, a section shared by the C, M, Y data is subjected to UCR (under color reduction) processing to generate Bk data, and then C, M, Y, Bk data are outputted. Here, in the black edge character region, if the black characters on the original copy are colored because of displacement of positions where the RGB are read by the scanner, or if overlapped positions of YMCBk are displaced at the time of printing, poor readability is caused, thus only the black character region is outputted with Bk single-color data (C, M, Y data are not printed out) by means of a signal corresponding to the brightness of the black character region.

The γ correction section 42 performs processing in accordance with the frequency characteristics of γ. Also, the gradation processing section 43 performs quantization such as dither processing in accordance with the tone characteristics of the plotter or the edge amount. At the time of quantization processing, a black character signal may be outputted (processing of black character extraction, which is described hereinafter) to enhance the contrast of the black characters. Accordingly, the readability of the characters is improved.

Figure 10:
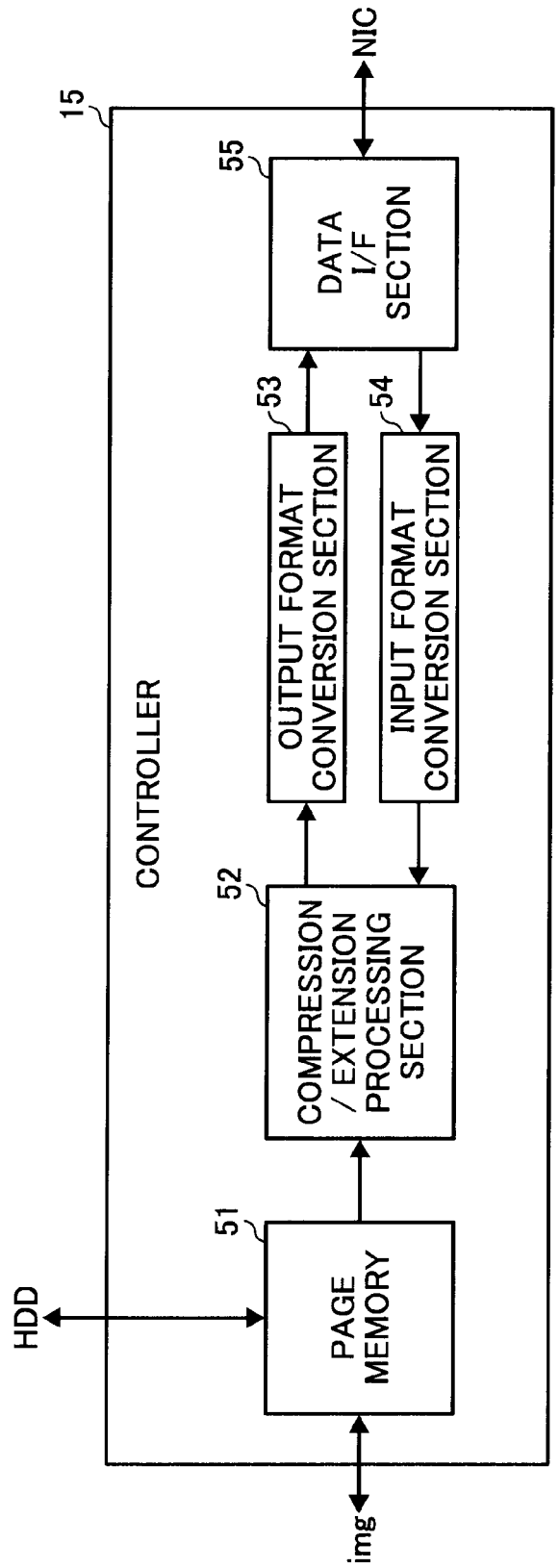
FIG. 10 is a block diagram showing a configuration of a controller of the color copying machine.

As shown in FIG. 10, the controller 15 is constituted by a page memory 51, a compression/extension processing section 52, an output format conversion section 53, an input format conversion section 54, and a data i/f section 55.

Next, explained is a flow of image data when outputting the data to an external device. The compression/extension processing section 52 extends the image data, which is present in the page memory 51 and subjected to compression processing, to the original 8-bit data for each color, and outputs the data to the output format conversion section 53. The output format conversion section 53 performs color conversion from the RGB data into sRGB data which is a standard color space, and at the same time performs general-purpose image format conversion or the like for converting the image data into JPEG or TIFF format. The data i/f section 55 outputs the data in the output format conversion section to the NIC 20.

Next explained is a flow of the image data when outputting the image data obtained from the external device, to the plotter 19. A command issued from the outside is analyzed by a CPU which is not shown, and then written into the page memory 51. The data i/f section 55 expands the image data into bitmap data by means of the input format conversion section 54, compresses the data by means of the compression/extension processing section 52, and writes thus obtained compressed data into the page memory 51. The expanded image with the input format data is a natural image in JPG or TIFF format.

Figure 11:
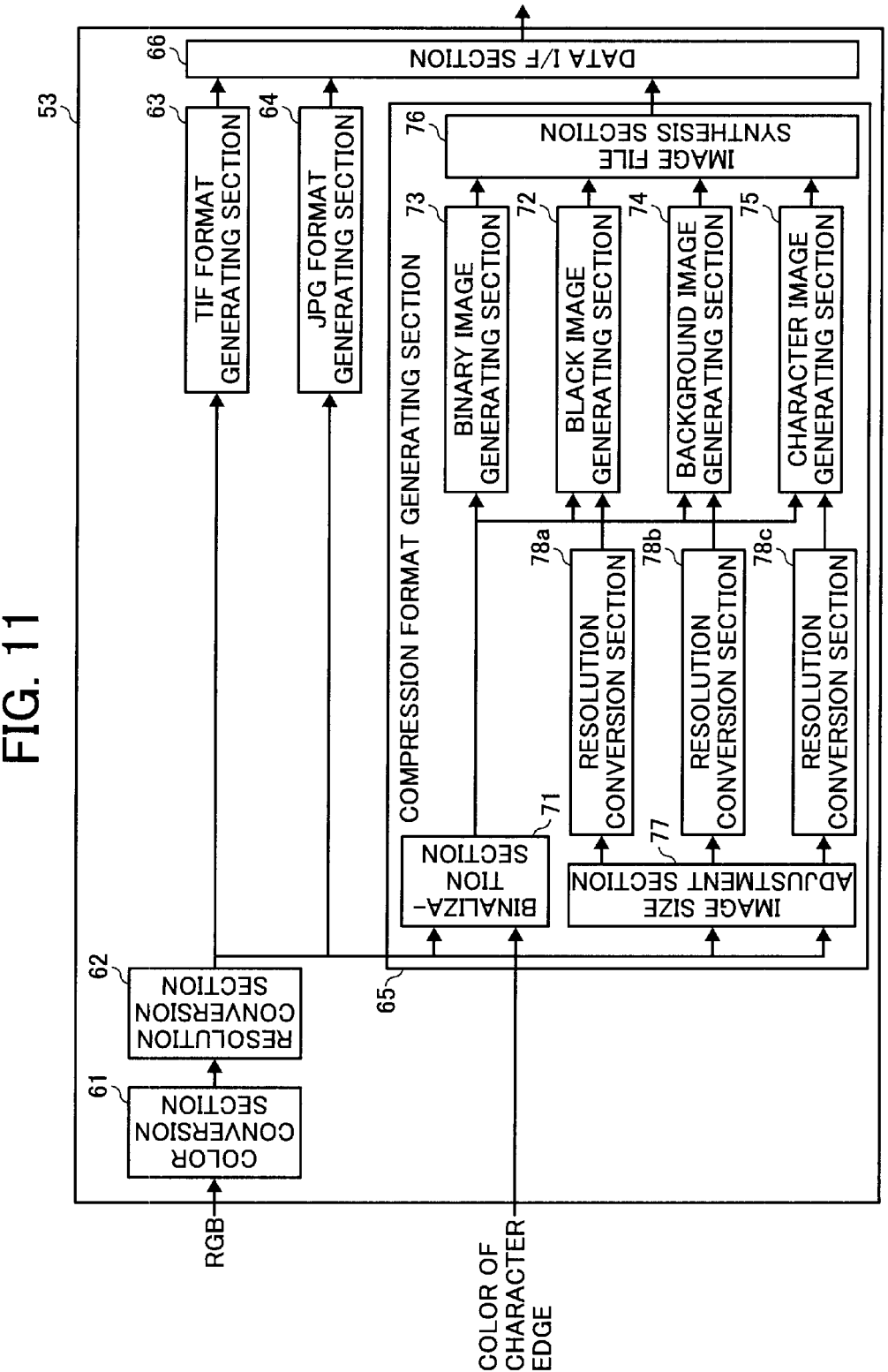
FIG. 11 is a block diagram showing a configuration of an output format conversion section of the controller.

Next, the output format conversion section 53 is explained with reference to FIG. 11. The output format conversion section 53 is for implementing the image processing apparatus of the present invention, and is constituted by a color conversion section 61, a resolution conversion section 62, a TIF format generating section 63, a JPG format generating section 64, a compression format generating section 65, and a data i/f section 66.

The color conversion section 61 converts the RGB data into the sRGB data. The resolution conversion section 62 subjects the sRGB data to pixel density conversion to obtain a pixel density of 300 dpi, 200 dpi or the like. In the present embodiment, explained is a case in which the conversion is performed to obtain a pixel density of 300 dpi.

An image, which is subjected to resolution conversion, is converted into each format by each format generating section (the TIF format generating section 63, JPG format generating section 64, and compression format generating section 65). The data i/f section 66 outputs a format that should be outputted to the NIC 20.

Next, the compression format generating section 65 is explained.

The compression format generating section 65 is constituted by a binarization section 71, a black image generating section 72, a binary image generating section 73, a background image generating section 74, a character image generating section 75, an image file synthesis section 76, an image size adjustment section 77, and resolution conversion sections 78*a*, 78*b*, 78*c*. The resolution conversion section 78*a* generates an input image of the background image generating section, the resolution conversion section 78*b* generates an input image of the character image generating section, and the resolution conversion section 78*c* generates an input image of the black character image generating section.

The binarization section 71 outputs binary data and black character data of a character region and non-character region on the basis of the contrast of image density. The binary image generating section 73 performs MMR compression, which is reversible conversion, on the binary data.

The image size adjustment section 77, which is remainder computation means, computes a remainder by dividing the number of pixels of input image data by the maximum value of the ratio of the resolutions of a black character image, background image, binary image, and character image, for both vertical and horizontal directions of an image.

A specific example of the above process is described hereinafter. Suppose that the number of horizontal and vertical pixels of input image data are 3003 and 2000 respectively. Also, suppose that 300 dpi image data is inputted, that the black character image and the background image have a resolution of 150 dpi, and that the character image has a resolution of 75 dpi, to perform the following computation.

"resolution of binary image generating section:resolution of black image generating section:resolution of background image generating section:resolution of character image generating section=300:150:150:75=4:2:1:1"

Maximum value of the ratio of the above resolutions=4

Computation of a remainder in the vertical direction=the number of pixels in the vertical direction/maximum value of the ratio of the resolutions=3003/4=3

Computation of a remainder in the horizontal direction=the number of pixels in the horizontal direction/maximum value of the ratio of the resolutions=2000/4=0

Here, suppose that the magnification of the resolution of each image data with respect to the input image is previously determined to ½ of black character image or background image: input image, ¼ of character image:input image, or 1/1 of binary image:input image.

Next, the image size adjustment section 77, which is processing means, deletes the lines corresponding to the number of pixels as the remainder, from a lower end and right end, in vertical and horizontal directions. It should be noted here that the lines are deleted from the lower end and right end, but the lines may be deleted from an upper end and left end.

In the above specific example, the remainder in the vertical direction=3, and the remainder in the horizontal direction=0, thus three lines of pixels on the lower end of the input image data are deleted, and deletion is not performed from the right end. The reason that deletion is not performed from the right end is because the remainder is 0. Further, although deletion is performed from the lower end or right end here, but deletion may be performed from the upper end of left end.

As described above, in this example the lines are deleted so that the remainder becomes 0, thus it is guaranteed that an image to be processed or an image to be outputted does not become larger than the input image.

Further, other example of processing executed by the image size adjustment section 77 is described.

The image size adjustment section 77 may add, to the lower end or right end, lines which are obtained by subtracting the number of pixels, which is the remainder, from the maximum value of the ratio of the resolutions. The value of the pixel on the line to be added may not be arbitrary and is preferably obtained by copying the value of pixels on the left and right of the front line to be added, so as to be the same color as that of the value of the pixel butting on the line to be added, but the value of the pixel on the line to be added is not limited to this example.

Although the lines are added to the lower end or right end, the lines may be added to the upper end or left end. In this case, the values of the pixels on the lower end and right end on the front line to be added may be copied.

For example, in the above specific example, the remainder in the vertical direction=3, and the remainder in the horizontal direction=0, thus one line of pixels are added to the lower end of the input image data, and addition of the pixels to the right end is not performed. The reason that addition of the pixels to the right end is not performed is because the remainder is 0.

In this example, the lines are added so that the remainder becomes 0, thus it is guaranteed that an image to be processed or an image to be outputted does not become smaller than the input image.

In this example, the value of the pixels on the line to be added is same as the value of pixels abutting on the line to be added, but in such a case image data different from that of the actual image is added.

However, generally, printing paper is a white paper. Further, on a monitor displaying an image, the outside of the displayed image is usually white. For this reason, in most cases where a synthetic image is used, the pixel value is set to a value corresponding to the white color, whereby the white color and the color on the outside of the image are not distinguished.

Therefore, all pixels on the line to be added in the binary image are preferably in the non-character region, and all pixels on the line to be added in the background image preferably correspond to the white color. Furthermore, all pixels on the line to be added in the black character image preferably correspond to the white color.

Accordingly, for each position on the line to be added, white color is selected from the background image out of the background image and the character image, and since the pixels are not black character pixels, these pixels become white at the time of synthesizing. The value of the pixel on the lint to be added in the character image may be any value, and is preferably a value at which the compression ratio is reduced. Suppose that the compression method for compressing the character image is a JPG compression method. In a block of 8×8 at the time JPG compression, the block having both the pixels on the line to be added and the pixels abutting on the line to be added, it is preferred to add the value of the pixels on a line abutting on the line to be added. In other case, the compression ratio can be reduced by inputting 0.

In the above specific example, the remainder in the vertical direction=3, and the remainder in the horizontal direction=0, thus three lines of pixels are added to the lower end of the input image data, and addition of the pixels to the right end is not performed. The reason that addition of the pixel to the right end is not performed is because the remainder is 0.

The lines are added so that the remainder becomes 0, thus it is guaranteed that an image to be processed or an image to be outputted does not become smaller than the input image.

Next, the resolution conversion sections 78a, 78b, 78c convert the resolution to a predetermined resolution. The resolution conversion section 78a generates input image data of the background image, and thus reduces the resolution to ½. The resolution conversion section 78b generates input image data of the character image, and thus reduces the resolution to ¼. The resolution conversion section 78c generates input image data of the black character image, and thus drops the resolution to ½.

The black image generating section 72 performs MMR compression, which is reversible conversion, on the black character data. Furthermore, the background image generating section 74 rewrites the image data in a region which is changed to the character region by the binarization section 71, to the image data of a constant value corresponding to white, and performs JPG compression which is lossy compression. Further, the character image generating section 75 rewrites the image data in a region which is changed to the character background region, to the image data of a constant value corresponding to white, and performs JPG compression which is lossy compression. The reason that the data of a constant value is applied to the character section in the background image instead of applying a constant value is to improve compression. Regarding the character image as well, the background image is set to a fixed value to improve compression. The resolution conversion sections 78a, 78b, 78c may set the resolution to approximately 150 dpi, because higher resolution brings accurate character image although the character image may not require resolution higher than that of the background image. In the case where the bibliographic image is the original copy with characters only, JPG files are created at a resolution of 75 dpi for both background image and character image. Reduction of the resolution of the characters does not cause any problem although the tone is deteriorated if the resolution of the JPG image is reduced, because the resolution of the characters is compensated by the MMR resolution. The size of the files can be reduced by reducing the resolution. There is described as the bibliographic information in the accumulated data whether or not there is the original copy with characters only, thus the compression ratio can be increased for the image data in the original copy with characters only.

The image file synthesis section 76 synthesizes four images, i.e. the output of the binary image generating section 73 (MMR), output of the black image generating section 72 (MMR), output of the background image generating section (JPG), and output of the character image generating section (JPG), and puts these images in one file. A general-purpose format (PDF file or the like) may be used as the file format of this file.

Figure 12:
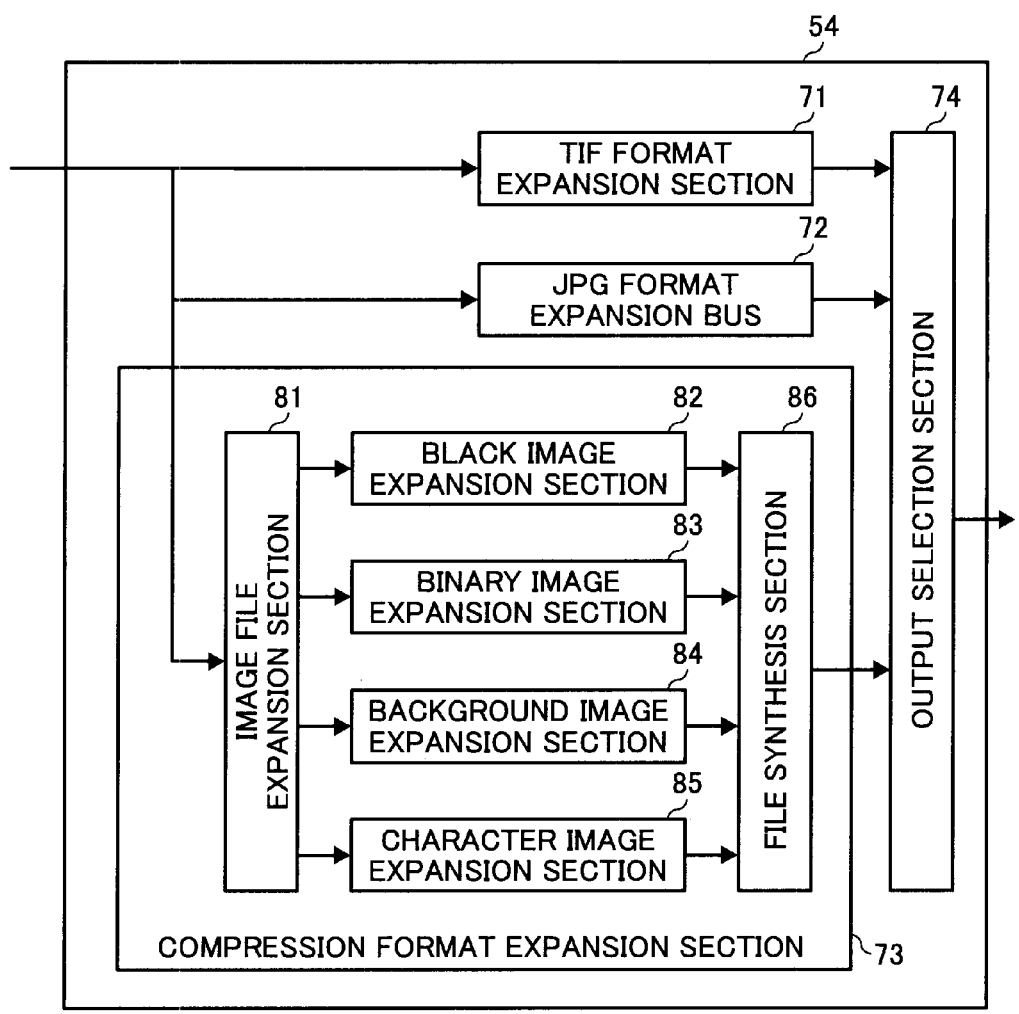
FIG. 12 is a block diagram showing a configuration of an input format conversion section of the controller.

Next, The input format conversion section 54 is explained with reference to FIG. 12.

The input format conversion section 54 is constituted by a TIF format expansion section 71, JPG format expansion section 72, compression format expansion section 73, and out put selection selecting 74. The TIF format expansion section 71, JPG format expansion section 72, and compression format expansion section 73 have a function of expanding each format into a bitmap, and the output selecting section 74 selects one format out of three formats, outputs the format, and at the same time converts RGB data into YMCBk data.

If the input image data is in TIF format, the input image data is expanded into bitmap data by the TIF format expansion section 71. If the input image is in JPG format, the input image data is expanded into bitmap data by the JPG format expansion section 72. If the input image is in compression format, the input image data is expanded by the compression format expansion section 73.

The compression format expansion section 73 is explained. The compression format expansion section 73 is constituted by an image file expansion section 81, black image expansion section 82, binary image expansion section 83, background image expansion section 84, character image expansion section 85, and file synthesis section 86.

The image file expansion section 81 outputs four files out of the files generated by the compression format generating section 65 shown in FIG. 5, as image data items corresponding to the black image expansion section 82, binary image expansion section 83, background image expansion section 84, and character image expansion section 85 respectively on a lower stage.

The binary image expansion section 83 stretches MMR and expands it into a bitmap. The black image expansion section 82 extends MMR and expands it into a bitmap. The background image expansion section 84 expands JPG of the background image into a bitmap. The character image expansion section 85 expands JPG of the character image into a bitmap.

The four expanded bitmap data items are synthesized into one bitmap data item by the image file synthesis section 86.

If the output of the binary image expansion section 83 is the character region, each image expansion section outputs image data which is an output of the character image expansion section 85. If the out put of the binary image expansion section 83 is the non-character region, each image expansion section outputs image data which is an output of the background image expansion section 84. Moreover, if the output of the black image expansion section 82 is a black character, image data is outputted in black. Accordingly, one image is generated. The resolution of the character region and of the non-character region is the resolution of a binary image.

Figure 13:
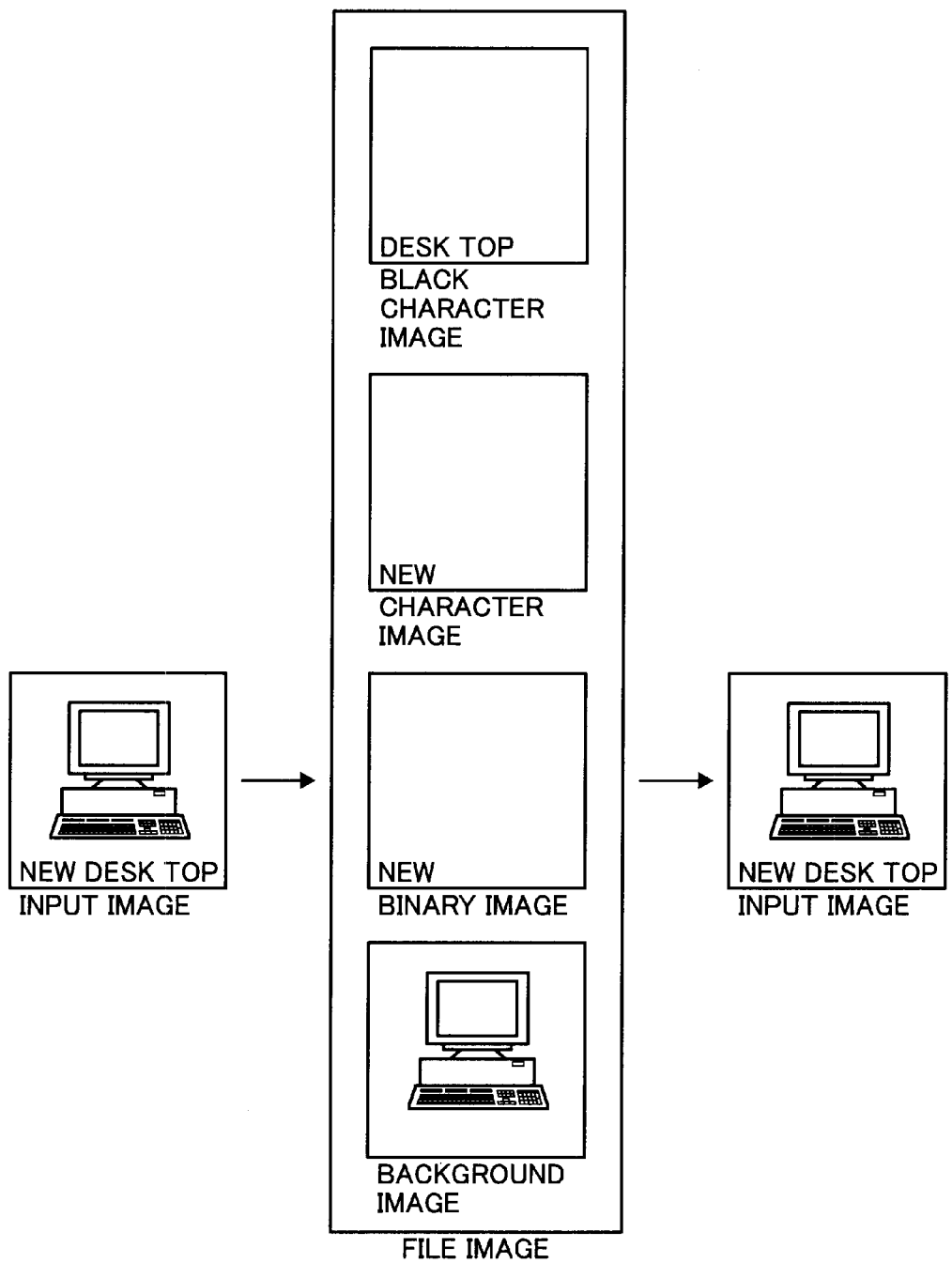
FIG. 13 is an image diagram of an input image, file image, and output image.

FIG. 13 shows an input image, file image, and output image. The synthesized image data items are outputted to the outside via the data i/f section 66. A plurality of image data items correspond to an intended region of the synthesis image, and even when the output image data is displayed on the monitor or printed out, the characters distortion does not occur, and the colors in the character region/non-character region are not shifted.

Other Embodiment is Described

FIG. 14 shows an electrical connection in a computer according to other embodiment. A computer 101 is a PC or the like, wherein a CPU 102 is connected to memory 103 comprising various ROM and RAM via a bus 110. A magnetic storage (HDD) 104, input devices 105 such as a keyboard and memory, a display device 106 such as LCD, a communication control device 108 which performs communication with a network 107 such as the Internet, and a reader 109 which reads storage data of a storage medium 111 are connected to the bus 103. As the reader 109, an optical disk drive device, magneto-optical disk drive device, flexible disk drive device or the like is used in accordance with the type of the recording medium 108 such as an optical disk, magneto-optical disk, and flexible disk.

The computer 101 reads a program recorded in the recording medium 111 by means of the reader 109, and installs the program in the HDD 104, to execute predetermined processing. The recording medium 111 and the program recorded in the recording medium 111 and installed in the HDD 104 are for implement the recording medium and program of the present invention. The program may be operated on a predetermined OS.

The processing to be executed by the program is same as the processing executed by the output format conversion section 53, thus the detailed explanation thereof is omitted.

As described above, the present invention comprises the image size adjustment section which divides the number of pixels on the vertical direction and horizontal direction of the input image data by the maximum value of the ratio of resolutions of a plurality of image data items configuring a synthetic image, and adjusts the image size. The image size adjustment section comprises the remainder computation means for computing a remainder by dividing the number of pixels in the vertical direction and in the horizontal direction of the input image data by the maximum value of the ratio, and the size adjusting means for adjusting the number of pixels in the vertical direction and in the horizontal direction of the input image data, on the basis of the remainder computed by the remainder computation means, so that the remainder becomes 0. Therefore, displacement of the positions of the pixels between the image data items configuring a compressed file can be avoided. Moreover, when creating a synthetic image, character distortion and displacement of colors in the character region/non-character region can be prevented from occurring.

Various modifications will become possible for those skilled in the art after receiving the teachings of the present disclosure without departing from the scope thereof.

What is claimed is:

1. An image processing apparatus, comprising an image size adjustment section, which, in order to synthesize a plurality of image data items to create one image, divides, respectively, the number of pixels, in a vertical direction and in a horizontal direction, of input image data by the maximum value of the ratio of resolutions of the plurality of image data items configuring the synthetic image, and adjusts the image size, wherein
the image size adjustment section comprises: remainder computation means for obtaining the ratio from the resolutions of the plurality of image data items, and computing a remainder by dividing, respectively, the number of pixels in the vertical direction and in the horizontal direction of the input image data by the maximum value of the ratio; and size adjusting means for adjusting, respectively, the number of pixels in the vertical direction and in the horizontal direction of the input image data, on the basis of the remainder computed by the remainder computation means, so that the remainder becomes 0.

2. The image processing apparatus according to claim 1, wherein, as a result of obtaining the remainder in the vertical and horizontal directions of the input image data by means of the remainder computation means, when the remainder is present in the vertical direction, the size adjusting means deletes the number of lines corresponding to the remaining number of pixels in the vertical direction, and when the remainder is present in the horizontal direction as a result of obtaining the remainder in the vertical and horizontal directions of the input image data, the size adjusting means deletes the number of pixels corresponding to the remainder present in the horizontal direction.

3. The image processing apparatus according to claim 1, wherein, as a result of obtaining the remainder in the vertical and horizontal directions of the input image data by means of the remainder computation means, when the remainder is present in the vertical direction, the size adjusting means adds the number of lines corresponding to a value obtained by subtracting the remaining number of pixels in the vertical direction from the maximum value of the ratio, and when the remainder is present in the horizontal direction as a result of obtaining the remainder in the vertical and horizontal directions of the input image data, the size adjusting means adds the number of pixels corresponding to a value obtained by subtracting the remaining number of pixels in the horizontal direction from the maximum value of the ratio.

4. The image processing apparatus according to claim 3, wherein, as a result of obtaining the remainder in the vertical and horizontal directions of the input image data by means of the remainder computation means, when the remainder is present in the vertical and horizontal directions, the size adjusting means sets, as a value corresponding to a white color, a pixel value, which is obtained by adding the number of lines or pixels corresponding to the value obtained by subtracting the remaining number of pixels in the vertical and horizontal directions from the maximum value of the ratio.

5. An image processing method, comprising an image size adjusting step of, in order to synthesize a plurality of image data items to create one image, dividing, respectively, the number of pixels in a vertical direction and in a horizontal direction of input image data by the maximum value of the ratio of resolutions of the plurality of image data items configuring the synthetic image, and adjusting the image size, wherein
the image size adjusting step comprises: a remainder computation step of obtaining the ratio from the resolutions of the plurality of image data items, and computing a remainder by dividing, respectively, the number of pixels in the vertical direction and in the horizontal direction of the input image data by the maximum value of the ratio; and a size adjusting step of adjusting, respectively, the number of pixels in the vertical direction and in the horizontal direction of the input image data, on the basis of the remainder computed in the remainder computation step, so that the remainder becomes 0.

6. The image processing method according to claim 5, wherein, as a result of obtaining the remainder in the vertical and horizontal directions of the input image data by means of the remainder computation step, when the remainder is present in the vertical direction, the size adjusting step deletes the number of lines corresponding to the remaining number of pixels in the vertical direction, and when the remainder is present in the horizontal direction as a result of obtaining the remainder in the vertical and horizontal directions of the input image data, the size adjusting step deletes the number of pixels corresponding to the remainder present in the horizontal direction.

7. The image processing method according to claim 5, wherein, as a result of obtaining the remainder in the vertical and horizontal directions of the input image data by means of the remainder computation step, when the remainder is present in the vertical direction, the size adjusting step adds the number of lines corresponding to a value obtained by subtracting the remaining number of pixels in the vertical direction from the maximum value of the ratio, and when the remainder is present in the horizontal direction as a result of obtaining the remainder in the vertical and horizontal directions of the input image data, the size adjusting step adds the number of pixels corresponding to a value obtained by subtracting the remaining number of pixels in the horizontal direction from the maximum value of the ratio.

8. The image processing method according to claim 7, wherein, as a result of obtaining the remainder in the vertical and horizontal directions of the input image data by means of the remainder computation step, when the remainder is present in the vertical and horizontal directions, the size adjusting step sets, as a value corresponding to a white color, a pixel value, which is obtained by adding the number of lines or pixels corresponding to the value obtained by subtracting the remaining number of pixels in the vertical and horizontal directions from the maximum value of the ratio.

9. A non-transitory computer readable storage medium storing thereon an image processing program, which is programmed so that a computer can execute the image processing method, the image processing method, comprising an image size adjusting step of, in order to synthesize a plurality of image data items to create one image, dividing, respectively, the number of pixels in a vertical direction and in a horizontal direction of input image data by the maximum value of the ratio of resolutions of the plurality of image data items configuring the synthetic image, and adjusting the image size, wherein
the image size adjusting step comprises: a remainder computation step of obtaining the ratio from the resolutions of the plurality of image data items, and computing a remainder by dividing, respectively, the number of pixels in the vertical direction and in the horizontal direction of the input image data by the maximum value of the ratio; and a size adjusting step of adjusting, respectively, the number of pixels in the vertical direction and in the horizontal direction of the input image data, on the basis of the remainder computed in the remainder computation step, so that the remainder becomes 0.

10. A non-transitory computer readable recording medium, which is recorded in a format in which a computer can read an image processing program which is programmed so that the computer can control the image processing method, the image processing method, comprising an image size adjusting step of, in order to synthesize a plurality of image data items to create one image, dividing, respectively, the number of pixels in a vertical direction and in a horizontal direction of input image data by the maximum value of the ratio of resolutions of the plurality of image data items configuring the synthetic image, and adjusting the image size, wherein
the image size adjusting step comprises: a remainder computation step of obtaining the ratio from the resolutions of the plurality of image data items, and computing a remainder by dividing, respectively, the number of pixels in the vertical direction and in the horizontal direction of the input image data by the maximum value of the ratio; and a size adjusting step of adjusting, respectively, the number of pixels in the vertical direction and in the horizontal direction of the input image data, on the basis of the remainder computed in the remainder computation step, so that the remainder becomes 0.

11. An image forming apparatus comprising an image processing apparatus, wherein the image processing apparatus comprises an image size adjustment section, which, in order to synthesize a plurality of image data items to create one image, divides, respectively, the number of pixels, in a vertical direction and in a horizontal direction, of input image data by the maximum value of the ratio of resolutions of the plurality of image data items configuring the synthetic image, and adjusts the image size, wherein the image size adjustment section comprises: remainder computation means for obtaining the ratio from the resolutions of the plurality of image data items, and computing a remainder by dividing, respectively, the number of pixels in the vertical direction and in the horizontal direction of the input image data by the maximum value of the ratio; and size adjusting means for adjusting, respectively, the number of pixels in the vertical direction and in the horizontal direction of the input image data, on the basis of the remainder computed by the remainder computation means, so that the remainder becomes 0.

\* \* \* \* \*